Nov. 7, 1967 R. D. RUMSEY 3,351,121
HATCH COVER WITH PISTON-LEVER ROTARY ACTUATORS
Filed Sept. 1, 1965 3 Sheets-Sheet 1
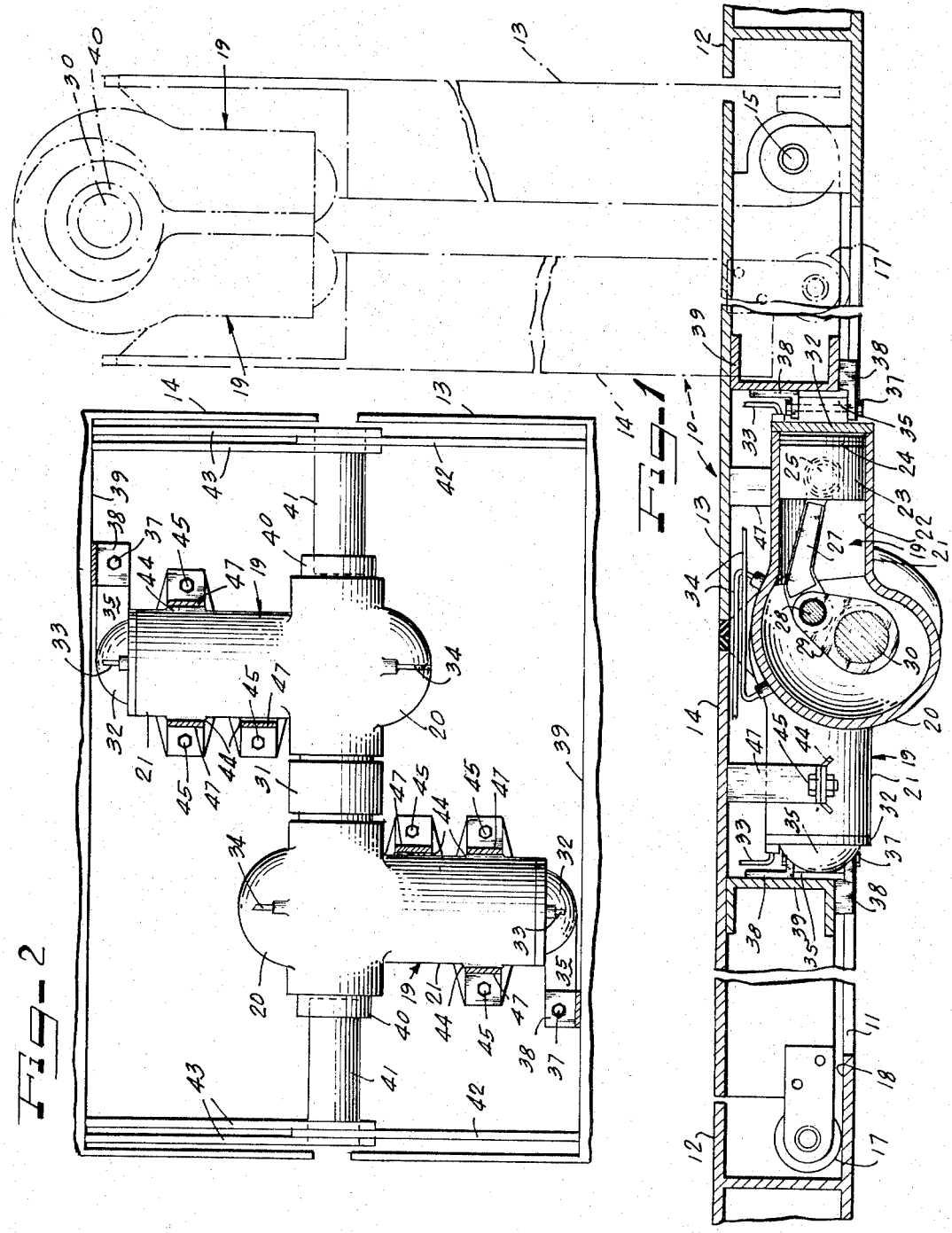
INVENTOR.
ROLLIN DOUGLAS RUMSEY
BY
ATTORNEYS

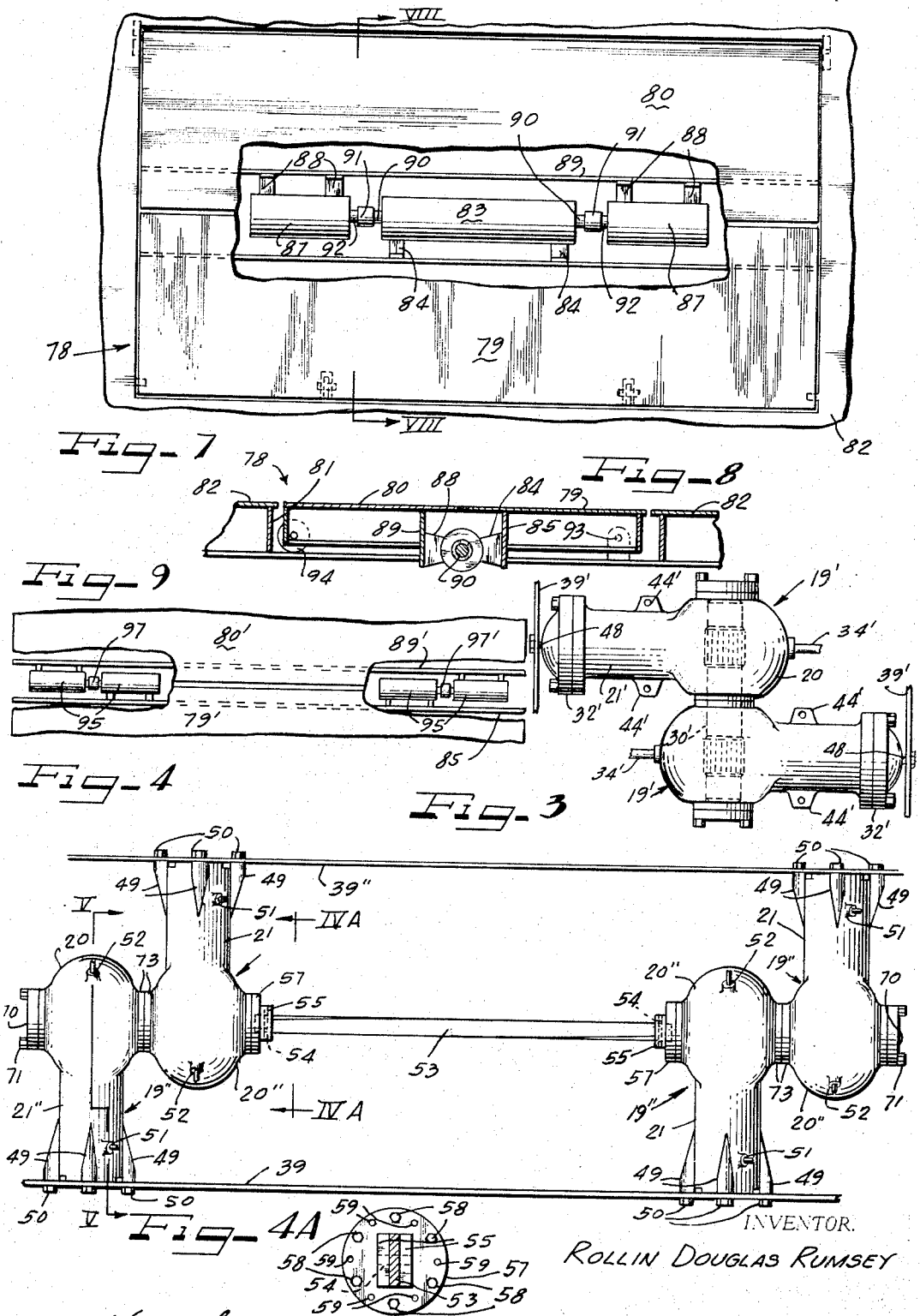

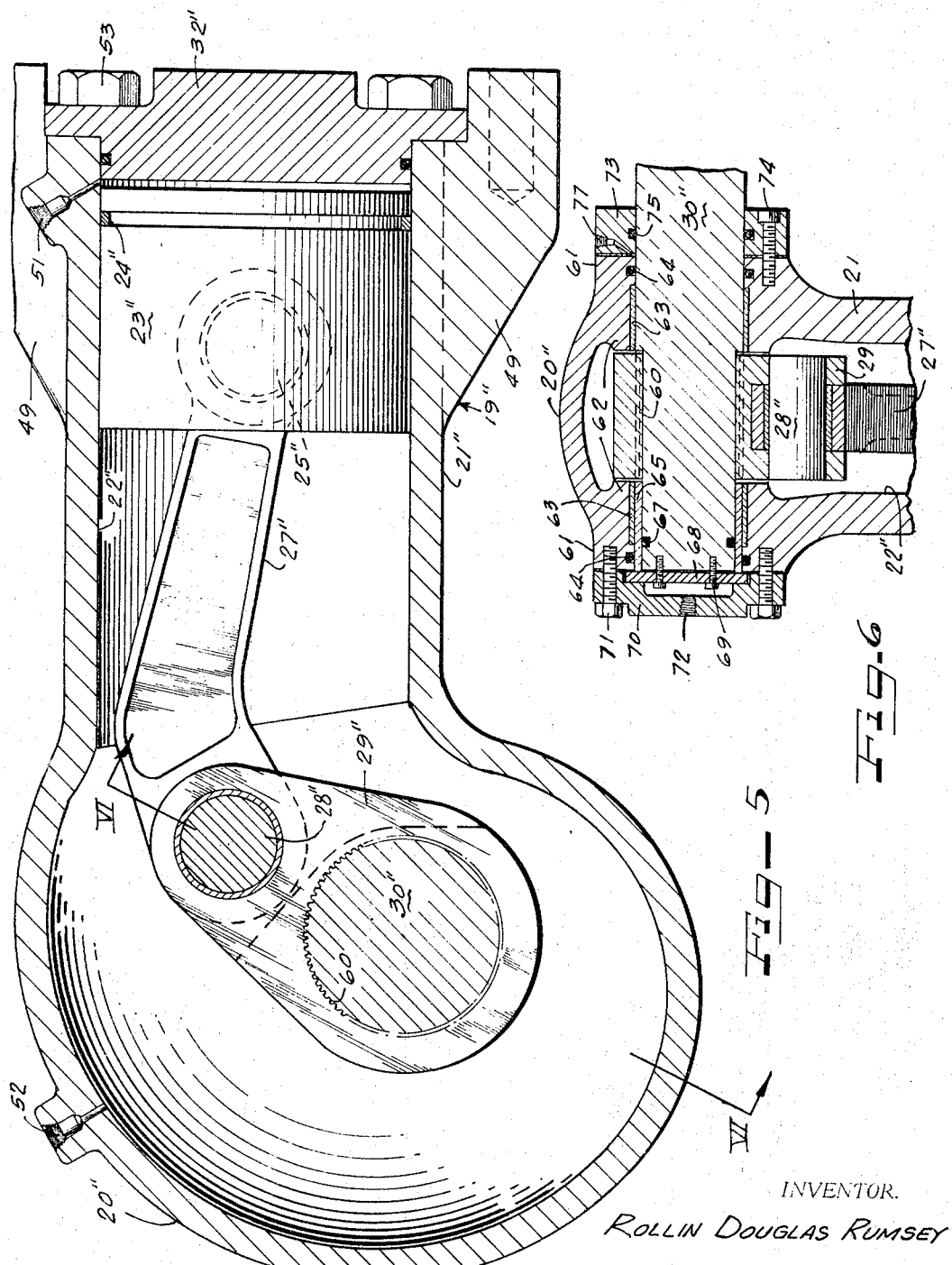

United States Patent Office 3,351,121
Patented Nov. 7, 1967

3,351,121
HATCH COVER WITH PISTON-LEVER
ROTARY ACTUATORS
Rollin Douglas Rumsey, Buffalo, N.Y., assignor to
Houdaille Industries, Inc., Buffalo, N.Y., a corporation
of Michigan
Filed Sept. 1, 1965, Ser. No. 484,334
13 Claims. (Cl. 160—188)

ABSTRACT OF THE DISCLOSURE

For foldable opening and closing hatch cover panels, a plurality of rotary actuators are relative oppositely rotatable about a common axis on common rigid shaft means and with the actuators respectively fixed to the respective panels. Piston lever actuators have the head portions thereof rotatable on the common shaft means and cylinder lever portions extending respectively oppositely away from the shaft in the flat condition of the panels, with reaction means between the shaft means and the piston in each of the actuators causing the relative rotary movement and thus the panel actuating function of the actuators. In a stabilized three-actuator arrangement on a common rigid shaft axis an intermediate actuator is attached fixedly to one closure panel and the other two actuators are fixedly attached to the other closure panel.

---

This invention relates to improvements in means for efficient power operation of foldable closures such as hatch covers, doors, and the like.

Although hydraulic devices of various sorts have heretofore been proposed for opening and closing the generally fairly heavy movable sections of hatch covers of cargo vessels, various problems have presented themselves. Among such problems is that due to the substantial weights involved the power requirements for actuation have made it desirable to use a plurality of hydraulic actuators at the door or cover panel joint to develop the requisite power within an actuator envelope or housing size of relatively small, space-saving proportions. However, due to numerous variables, synchronization in operation of the actuators is difficult to attain, resulting in skewing of the cover members, scuffing of the hatch weather seals, and the like. To combat this, stabilizing structures may be used but that adds cost to the installation.

Accordingly, it is an important object of the present invention to provide a new and improved hatch cover actuating arrangement embodying the advantages accruing from the use of a plurality of hydraulic actuators for opening and closing a hatch cover or similar closure and overcoming any lack in synchronization of actuator operation in a simple and direct manner, avoiding any need for special linkages or other auxiliary structure.

Another object of the invention is to provide new and improved synchronizing means for plural hatch cover actuators.

A further object of the invention is to provide a new and improved low cost hatch cover actuating system of simplified, rugged, efficient construction.

According to the principles of the invention, a plurality of rotary actuators is mounted on a common axis on rigid shaft means with reaction means in the actuators and on the shaft means causing the actuators to rotate in respective opposite directions for correspondingly moving closure members between folded open and generally coplanar closed positions. Piston lever actuators have piston lever portions thereof extending in respectively opposite directions from the common shaft means in the closed position of the panels and rigidly connected to the panels.

A pair of the actuators may have hinge pins coaxial with the shaft and extending from the outer sides of the head portions of the actuators to panel hinge joints. Torsion shaft means may be utilized between spaced apart pairs of the actuators along a hinge joint. A stabilized three-actuator arrangement on a common axis on rigid shaft means may be utilized. Where one side of the head portion of the actuator is closed by a closure plate a thrust flange member may be attached to the shaft with a flange portion operatively disposed between the adjacent hub end and the closure plate for maintaining the shaft and head against relative axial displacement. An especially advantageous banana-shaped piston rod link and torque arm relationship may be utilized in the piston lever rotary actuators.

Other objects, features and advantages of the present invention will be readily apparent from the following detailed description of certain preferred embodiments thereof taken in conjunction with the accompanying drawings in which:

FIGURE 1 is a generally schematic sectional elevational view shown a hatch cover installation embodying features of the invention;

FIGURE 2 is a fragmentary top plan view of the hatch cover installation of FIGURE 1 showing the actuators and their mounting and with the deck or top plates of the cover panels omitted for illustrative purposes;

FIGURE 3 is a schematic plan view of a modified arrangement of the hatch cover actuators;

FIGURE 4 is a schematic plan view of a further modified arrangement;

FIGURE 4A is a sectional detatil view taken on substantially IVA—IVA of FIGURE 4;

FIGURE 5 is an enlarged longitudinal sectional detail view taken substantially on the line V—V of FIGURE 4;

FIGURE 6 is a reduced scale sectional detail view taken substantially on line VI—VI of FIGURE 5;

FIGURE 7 is a top plan view showing yet another modification;

FIGURE 8 is a sectional view taken substantially on line VIII—VIII of FIGURE 7; and FIGURE 9 is a fragmentary top plan view of yet another modification.

With reference to FIGURES 1 and 2, a hatch cover assembly 10 is mounted for closing disposition over a hatchway or opening 11 within a deck 12, or the like. The hatch cover 10 comprises two complementary cover sections or panels 13 and 14, with the panel 13 pivotally mounted along one edge to the deck beam structure, as indicated at 15. The other cover panel 14 is provided with suitable anti-friction roller means 17 on its remote edge to ride rail means 18. Thereby, the panels are adapted to extend in closing relation over the hatchway 11 in side-by-side relation as shown in full outline in FIGURE 1, and are adapted to be moved into a folded, booked open position relationship as shown in dot dash outline. Although the hatch cover 10 is shown as comprising only one pair of cover panels, the principles of the invention are adapted for multiples of such paired panels or sections for long hatchway openings.

Improved means for power actuating the cover panels 13 and 14 between the hatchway closing and hatchway open positions comprise powered hinge means including rotary actuators 19 mounted on the respective cover panels and coupled for synchronized operation. In this instance, a coupled pair of the actuators is shown wherein the cover 10 is relatively narrow, but in a wider cover a plurality of such pairs of actuators with one of each pair mounted on each of the respective cover panels may be utilized along the hinged joint of the panels.

Each of the actuators 19 is of the piston-lever rotary type comprising a cast metal body comprising a preferably unitary as nearly as practicable spherical hollow head portion 20 and an aligned substantially tubular cylindrical elongated portion 21 having therein a cylinder 22 and providing an actuating lever. Reciprocably slidable in the cylinder 22 is a piston 23 provided with a piston ring 24 in its perimeter. Operatively connected to the piston 23 by means of a wrist pin 25 is a preferably generally banana-shaped link or piston rod 27 extending forwardly into the chamber defined within the head 20 and pivotally attached by means of a bearing pin 28 to the distal end portion of a torque arm 29 splined on a shaft 30 through which the actuator is coupled operatively with its companion actuator 19. Although the shaft 30 may be common to both of the paired actuators 19, for practical reasons it is desirable to have each of the actuators 19 provided with an individual stub shaft with a portion of the shaft extending at least from one side of the head 20 sufficiently to enable corotative coupling of the shafts by means of a suitable coupling 31 (FIG. 2).

By having the torque arm 29 of each of the actuators 19 angled toward the crank portion 21 of the actuator from the shaft 30 offset substantially to one side of the reciprocal axis of the piston 23, the piston is adapted to be located adjacent to an outer or rear end closure or cap 32 sealing the opening into the cylinder 22. Then, by introducing hydraulic pressure fluid into the cylinder chamber between the closure cap 32 and the piston 23, as by means of a duct and port arrangement 33, separating movement of the piston 23 and the end closure 32 is effected. Since the piston is anchored against movement toward the torque arm 29 in each instance by virtue of the rigid corotative coupling of the shafts of the two actuators, the hydraulic pressure causes a cranking torque to be generated between the crank portion of the actuator body and the piston 23. On reference to FIGURE 1 it will be observed that since the actuators 19 are in opposed relation and with the torque arms 29 extending generally upwardly and outwardly in each of the actuators, the pressure acting on the crown ends of the respective pistons 23 and the opposed end closures 32 forcing them apart causes the torque lever portions 21 to move in jackknifing relation downwardly and inwardly about the shaft 30.

By having the actuators 19 rigidly secured to the respective hatch cover panels 13 and 14 the torque action of the actuators under piston head pressurization is transmitted to the panels and causes them to move in jackknifing relation, resulting because of the fixed pivot 15 and the free roller mountings 17 in lifting of the panels from the full line closed position toward and eventually into the broken line open position, with each of the actuators synchronously accounting for 90° of the 180° jackknifing or booking about the hinge axis afforded by the shaft 30. Return movement of the panels toward closing position is effected by reversing the hydraulic fluid pressure, as by introducing pressure through respective supply lines 34 into the chambered head 20 of each of the actuators and bleeding off through the line 33.

Various means for rigidly attaching the actuators 19 to the respective hatch cover panels may be provided suitable to specific structural features of the panel frames and deck plates thereof. For example, a rigid attachment lug 35 on and integral with the end closure cap 32 of each of the actuators is constructed to project laterally toward the side of the actuator opposite to that on which the actuator shafts are rigidly coupled together and secured as by means of a bolt 37 to and between rigid attachment brackets 38 on a panel frame beam 39. This is an especially desirable arrangement with the attachment of the lug 35 as nearly as practicable in alignment with shear pin support through a torque-free socket 40 on the actuator shaft on the opposite side from the coupling 31 and within which is engaged a hinge pin 41 extending coaxially with the shaft inwardly from and coupling respective hinge bars 42 and 43 on the panels 13 and 14. Through this arrangement, the torque leverage of the actuators is transmitted as a shear force to the panel hinge joint through the hinge pins 41, with equalization of the shear loading and protection from bending stresses on the shaft 30 and the coupling 31. Auxiliary to the rigid attachment on each of the actuators 19 to its hatch cover panel through the attachment lug 35, one or more integral attachment lugs 44 may be provided on the sides of the torque arms 21 and attached by means of bolts 45 to respective rigid attachment brackets 47 provided for this purpose on the associated cover panel. These side attachment brackets 44 and their complementary attachment brackets on the cover panels are especially desirable where the hinge pins 41 may not be utilized and the actuator shaft structure relied upon entirely as the hinge pivot for the cover panel assembly.

In FIGURE 3 is shown an arrangement in which the torque lever rotary actuators 19' are coupled through a common shaft 30' which is integral in one piece and eliminates any coupling to attain the single shaft effect. It will be understood that construction and operation of the actuators 19' is, except as particularly pointed out, the same as the actuators 19 and primed reference numerals will be understood to embrace the same description as the corresponding unprimed reference numerals, even though not specifically mentioned at this point. In this instance, each of the actuators 19' is adapted to be secured at its outer or rear end to the associated hatch cover panel by means of a rearward attachment stud 48 on the end closure 32' anchored through and to the beam 39' or an equivalent rigid bracket. This attachment stud 48 also may serve as a nipple for attachment of a hydraulic pressure line for pressurizing the crown end of the associated piston.

FIGURE 4 depicts an arrangement in which the cover panels of a relatively wide hatch cover, door, or the like are hingedly actuated by spaced pairs of rotary actuators 19" in coupled cooperation on a shaft common to each of the pairs similar to the pair of actuators depicted in FIGURE 3. For rigid attachment of each of the actuators 19" to the associated cover panel, each of the torque lever cylinder portions 21" is provided with a plurality of rearwardly extending integral rigid attachment bosses 49 secured as by means of bolts 50 to the frame beam 39" or equivalent frame structure of the panel. A hydraulic pressure fluid connection for the crown end of the associated piston of each of the actuators 19" is through a nipple port 51 located between two of the bosses 49. Pressure fluid connection with the chamber within the substantially spherical head 20" is through a nipple port 52.

Load equalizing, stabilizing, torque sharing shaft means or counterbalancing torsion spring means are desirably provided between the spaced apart pairs of actuators 19". In one form, a shaft may be coaxially connected between the inside actuators substantially like the hinge pins 41 of FIGURE 2. Although individual torsion springs may be connected to the actuators, a desirable arrangement comprises a combination shaft and counterbalancing torsion spring 53 of rectangular cross section (FIGS. 4 and 4A). At each of its opposite ends, the torsion spring 53 is connected at each end as by means of a pin 54 to and between a pair of rigid attachment ears 55 integral with an end cap plate 57 secured as by means of bolts 58 and dowel pins 59 to the housing head 20" of the respective inside actuator 19". Installation of the torque spring shaft 53 is effected with the cover panels substantially fully jackknifed in the open position of the hatch cover. Then, as the cover panels move toward closed position twisting winding of the spring shaft occurs, with the stored energy affording efficient counterbalancing to lessen the torque leverage force required to open the hatch cover.

Although in FIGURES 5 and 6 the piston-lever rotary actuator 19" has been selected for depicting on an enlarged scale various elements of the structure in detail, it will be appreciated that many of such details are common to the actuators 19 and 19' as well, and more particularly those elements which are identified by double primed reference numerals, for example, the generally banana-shaped piston rod or link 27" which has this shape in order to afford clearance within its reentrant angle for the hub portion of the bifurcated torque arm 29" splined at 60 onto the cover hinge shaft 30".

Substantial reinforcement for the substantially spherical pressure vessel afforded by the head 20" and effective journal for the shaft 30" is afforded by a rugged hub structure at each side of the head comprising respective opposite aligned outwardly projecting hub flanges 61 providing aligned shaft journal bores and having inward respective reinforcing flange extensions 62 between the ends of which the hub of the torque arm 29" is maintained centered with respect to the axis of the cylinder 22". Respective bearings 63 engaging the shaft 30" are supported in the respective bores of the hubs 61 inwardly from high pressure dynamic seals 64 mounted in said bore.

In order to enable assembly of the shaft 30" through one of the hubs 61 into the splined engagement with the torque arm 29" which is assembled into the actuator housing through the open end of the cylinder, the end portion of the shaft is of sufficiently smaller diameter for clearance through the splined bore of the arm hub, and a journal sleeve 65 is fitted over the reduced diameter end portion, with a static seal 67 provided between the shaft and the sleeve. To prevent the sleeve 65 from turning and also to retain it on the shaft, a thrust flange disc 68 is secured as by means of bolts 69 to the end of the shaft and drawn up against the adjacent outer end of the sleeve to drive the opposite end of the sleeve against the opposing side of the torque arm hub. In addition, the thrust disc 68 serves as means to locate the shaft 30" axially and prevents the shaft from working in and out axially in either direction as well as carrying any axial hinge loads which may be exerted from one hatch cover panel to the other. Therefore, the thrust disc 68 is made from a hardened material such as steel or bronze with its margin running between the softer material such as ductile steel of the opposing end face of the hub 61 and an opposing cover plate 70 which may also be made of the softer material for purposes of economy and which is secured as by means of bolts 71 to the hub 61.

Means may be provided for draining the balanced dynamic pressure seals 64, although since the higher operating pressures are exerted at the opposite end of the cylinder such drain-off means may be omitted and effectiveness of the seals themselves relied upon to substantially prevent leakage. Suitable seal drain-off means may comprise a drain port 72 leading through the plate 70 from its inner side and connected to a suitable drain line (not shown). At the opposite side, a grease and dirt sealing ring 73 may encircle the shaft 30" and be attached to the opposing end of the hub 61 as by means of screws 74, with a low pressure seal 76 engaging the shaft. A drain port 77 leads from the inner end of the bore of the ring 73 to the outside and may be attached to a drain line (not shown).

In FIGURES 7 and 8 is disclosed an arrangement wherein a hatch cover assembly 78 comprising respective panels 79 and 80 in side-by-side relation closes the hatchway 81 in a deck 82 and the panels are hingedly connected at their adjacent edges on a common hinge line axis provided by vane type rotary actuators coupled end-to-end. In a desirable construction wherein the cover panels 80 are of substantial width, a vane type rotary actuator 83 may be secured as by means of brackets 84 rigidly to a beam 85 of the panel 79 in longitudinal central relation between and in coaxial alignment with a pair of axially spaced shorter rotary vane actuators 87 secured as by means of brackets 88 rigidly to a beam 89 of the panel 80. The central actuator 83 has a wing shaft 90 which extends from the opposite ends of the housing of this actuator and has its opposite end portions coupled fixedly as by means of respective couplings 91 to the respective wing shafts 92 of the actuators 87. Thereby the shafts 90 and 92 are, in effect, a common shaft for the aligned actuators, providing the hinge axis for the cover panels and effectively synchronizing operation of the actuators in opening and closing the hatch cover. Through suitable hydraulic circuitry the actuators 83 and 87 are powered to drive the actuator 83 clockwise as viewed in FIGURE 8 and the actuators 87 counterclockwise for applying a torque leverage which causes the common shaft structure to be thrust upwardly in the opening direction of the cover and the panels 79 and 80 jackknifed, the panel 79 pivoting about a fixed pivot 93 on its outer margin and the panel 80 to ride towards said pivot on rollers 94, on its outer margin. This arrangement affords equilized torque forces along the hinge line and avoids tendencies to warp.

In FIGURE 9 a similar rotary vane actuator arrangement is depicted except that two pairs of identical actuators are employed with one of the actuators in each pair rigidly secured to the beam 85' of the panel 79' and the other of the pair of actuators in each instance secured to the beam 89' of the panel 80'. The shafts of the actuators 95 in each pair are rigidly coupled together by means of a coupling 97. All of the actuators 95 are synchronously driven to open and close the cover panels 79' and 80' about the hinge axis afforded by the aligned shafts of the rotary vane actuators 95.

It will be understood that modifications and variations may be effected without departing from the scope of the novel concepts of the present invention.

I claim as my invention:

1. A cover assembly of the character described comprising a pair of panels in side-by-side relation and means enabling movement of said panels between a substantially coplanar position and a jackknifed position about a hinge axis and comprising:
   at least a pair of rotary hydraulic actuators one of which is rigidly mounted on one of said panels and the other of which is rigidly mounted on the other of said panels,
   and common rigid shaft structure mounted on and coaxial with said actuators and on said hinge axis and about which said actuators are rotatably operble in opposite rotary directions to move said panels between said positions;
   said actuators comprising piston-lever actuators each of which has a head portion rotatably mounted on and about said shaft structure and a torque lever portion projecting away from said shaft structure and attached rigidly to the associated panel, and said torque lever portions being operative about said shaft structure between oppositely extending and generally jackknifed relation and thereby effecting corresponding movements of said panels.

2. A cover assembly of the character described comprising a pair of panels in side-by-side relation and means enabling movement of said panels between a substantially coplanar position and a folded position about a hinge axis and comprising:
   a pair of rotary actuators one of which is rigidly attached to one of said panels and the other of which is rigidly attached to the other of said panels,
   a common shaft on said axis and on which said actuators are rotatable and said shaft being held nonrotatable relative to the actuators by means in the actuators and on said shaft operable to rotate said actuators in respectively opposite directions about said shaft whereby the actuators respectively provide opposite torque thrust on said shaft and on said panels for moving said panels between said positions, said actuators being in adjacent side-by-side relation and spaced from opposite ends of a joint along said hinge axis,
   and respective hinge pins coaxial with said shaft and mounted adjacent the ends of said joint and respectively connected to said actuators in shear thrust relationship.

3. A cover assembly of the character described comprising a pair of panels in side-by-side relation having a joint therebetween and means enabling movement of said panels about a hinge axis in said joint between a substantially coplanar position and a jackknifed position and comprising:

respective pairs of actuators spaced apart along said axis with one actuator of each pair secured to one of said panels and the other actuator of each pair secured to the other of said panels and each pair of actuators having a shaft on said axis with rigid torque means connecting the respective shaft to the pair of actuators associated therewith, and a stabilizing shaft portion connected between the inner actuator of each of said pairs of actuators coaxially with said shafts on said axis.

4. A cover assembly of the character described comprising a pair of panels in side-by-side relation having a joint therebetween and means enabling movement of said panels about a hinge axis in said joint between a substantially coplanar position and a jackknifed position and comprising:

respective pairs of actuators spaced apart along said axis with one actuator of each pair secured to one of said panels and the other actuator of each pair secured to the other of said panels and each pair of actuators having a shaft on said axis with rigid torque means connecting the respective shaft to the pair of actuators associated therewith, and counterbalancing torsion spring means connected to the inner actuator of each of said pairs of actuators.

5. A hatch cover assembly for a hatchway comprising a pair of panels extending over said hatchway in side-by-side relationship in upwardly facing closed position defining a joint therebetween and adapted to be folded about a hinge axis in said joint into a jackknifed open position at one side of said hatchway, actuators mounted on said panels operatively adjacent to said joint and in substantially spaced relation along said axis, said actuators including means for moving said panels between said closed and open positions, and torsion spring means on said axis between said actuators and operative to counterbalance the weight of said panels in the closed position to facilitate the operation of said actuators in moving the panels to said open position.

6. A hatch cover assembly for a hatchway comprising a pair of panels extending over said hatchway in side-by-side relationship in upwardly facing closed position defining a joint therebetween and adapted to be folded about a hinge axis in said joint into a jackknifed open position at one side of said hatchway, rotary actuators mounted on said panels in substantially spaced apart relation along said joint and having shaft means on said axis, and a torsion bar of rectangular cross section extending along said axis and attached at its opposite ends to the respective actuators and being in torsionally wound condition in the closed position of said panels whereby to afford a counterbalancing reaction to relieve the actuators of opening torque load when operated to move said panels toward the open position.

7. Apparatus for synchronously moving between open and closed positions about a hinge joint a pair of side-by-side hatch cover panels or the like, three rotary actuators, common rigid shaft means carried by and extending on a single axis through said actuators with the actuators aligned therealong with one of the actuators intermediate the other two actuators, said intermediate actuator being adapted to be operatively mounted on one of said panels, and the other two actuators being adapted to be operatively mounted on the other of said panels, and reaction means on said shaft means with which the actuators are synchronously coactive to operate said intermediate actuator to rotate in one direction on the shaft means and the other two actuators to rotate in the opposite rotary direction for moving said panels between open and closed positions.

8. In apparatus of the character described for moving side-by-side hatch cover panels or the like about a hinged joint between open and closed positions, a pair of piston-lever rotary actuators each including a hollow head portion having hub flanges coaxially aligned at opposite sides and a cylinder lever portion extending on an axis normal to an axis through said hub flanges and opening into the head, a rigid shaft extending through the hub flanges of each of the actuators and having respective torque arms rigid therewith and projecting laterally therefrom within said head portions, respective pistons reciprocably mounted in said cylinder lever portions and having means operatively connecting the pistons to the respective torque arms, and means for securing said cylinder lever portions operatively to the panels.

9. Apparatus as defined in claim 8 in which said shaft has at least on one end thereof a hardened thrust flange opposing an adjacent hub flange surface, and means secured in opposition to said hub flange surface and opposing the opposite side of said thrust flange.

10. A piston-lever rotary actuator assembly including a housing having a hollow head and a cylinder lever portion extending from said head and having a cylinder opening into the head, said head having bearing hubs at opposite sides aligned on an axis normal to the axis of said cylinder, a shaft extending through said bearing hubs and having an end aligned with the outer end of one of said hubs, a torque arm rigidly mounted on the shaft in said head, a piston in said cylinder operatively connected with said torque arm, a closure plate on said one hub end, and a thrust flange member attached to said shaft and having a flange portion operatively disposed between said hub end and said closure plate.

11. An actuator as defined in claim 10, wherein said shaft has a sleeve thereabout between said thrust flange and said torque arm and thrust toward said torque arm by said thrust flange.

12. A piston-lever rotary actuator for actuating a hatch cover panel or the like and comprising:

a hollow head defining a head chamber and a cylinder lever portion extending eccentrically from said head and defining a cylinder opening into said chamber.

said head having bearing bores at opposite sides thereof in coaxial alignment and on an axis normal to and offset from the axis of said cylinder, a shaft journaled in said bores and having a torque arm provided with a hub portion rigid therewith and with said shaft and the arm projecting from the shaft generally toward said cylinder and across the cylinder axis, a piston reciprocably mounted in said cylinder, means for supplying pressure fluid between the end of said cylinder opposite said chamber and said piston, and a generally banana-shaped piston rod link member connecting the piston and the torque arm and having a reentrant angle portion on the side thereof generally opposing said shaft whereby to afford clearance to receive said hub portion of said torque arm when the piston is pressurized as aforesaid whereby to effect movement of the head and cylinder lever portion rotatably about the shaft with movement of the piston rod link closely adjacent to said torque arm hub portion.

13. Apparatus for moving a pair of side-by-side hatch cover panels or the like synchronously between open and closed positions, comprising:

a pair of rotary piston-lever actuators each having a chambered head portion and a lever cylinder portion extending rigidly therefrom and opening thereinto and provided therein with a reciprocable piston having a piston rod link extending into the head portion chamber;

a comon axis rigid shaft structure carried by and journaled in said head portions with the axes of the lever portion cylinders extending generally normal to and offset from the shaft structure axis;

respective torque arms rigid on said shaft structure within said head portion chambers and projecting toward the respective associated cylinder axis in each instance;

said piston rod links being pivotally connected respectively to the torque arms;

and means for effecting pressure between said pistons and said lever cylinder portions to effect torque reaction by reason of the link connection of the pistons to the torque arms whereby to effect relative swinging movement of the actuators about said shaft structure for effecting corresponding movement of the panels to which the lever cylinder portions are attached.

References Cited

UNITED STATES PATENTS

| | | | |
|---|---|---|---|
| 2,855,038 | 10/1958 | Greer | 160—188 |
| 3,118,310 | 1/1964 | Jablonsky | 74—105 |
| 3,196,934 | 7/1965 | Sneen | 160—188 X |
| 3,288,202 | 11/1966 | Rumsey | 160—188 |

DAVID J. WILLIAMOWSKY, *Primary Examiner.*

P. M. CAUN, *Assistant Examiner.*